United States Patent [19]

Georges et al.

[11] 3,844,887
[45] Oct. 29, 1974

[54] NUCLEAR REACTOR FUEL ASSEMBLY

[75] Inventors: Nicholas J. Georges, Pittsburgh; William E. Pennell, Irwin, both of Pa.

[73] Assignee: Westinghouse Electric Corporation, Pittsburgh, Pa.

[22] Filed: Sept. 12, 1968

[21] Appl. No.: 759,410

[52] U.S. Cl. .................................. 176/78, 176/76
[51] Int. Cl. ............................................ G21c 3/34
[58] Field of Search ......................... 176/76, 78, 87

[56] References Cited
UNITED STATES PATENTS

| | | | |
|---|---|---|---|
| 3,255,091 | 6/1966 | Frisch | 176/78 |
| 3,301,764 | 1/1967 | Timbs et al. | 176/78 |
| 3,301,765 | 1/1967 | Eyre et al. | 176/78 |
| 3,314,860 | 4/1967 | Wilman | 176/78 |
| 3,431,171 | 3/1969 | Glandin | 176/78 |
| 3,432,287 | 1/1969 | Anthony et al. | 176/78 X |

Primary Examiner—Carl D. Quarforth
Assistant Examiner—Gary G. Solyst
Attorney, Agent, or Firm—Z. L. Dermer

[57] ABSTRACT

A fuel assembly comprising a plurality of spaced, parallel, and sheathed fuel bearing elements supported at a plurality of longitudinal locations within openings in laterally extending grid structures. Each opening in each grid structure receives a fuel element which is supported by a torsion spring having a cantilever loading arm which contacts the fuel element proximate a maximum flow area of the grid opening and by one oor more non-resilient dimples in opposition to the spring. In one embodiment of a honeycomb grid lattice, the lattice is formed by preferably brazing reduced sections of preformed half-honeycombs to achieve the desired fuel element spacing.

6 Claims, 7 Drawing Figures

NUCLEAR REACTOR FUEL ASSEMBLY

BACKGROUND OF THE INVENTION

This invention relates to fuel assemblies for nuclear reactors, and more particularly to fuel assemblies wherein spaced, parallel, and sheathed fissionable material bearing fuel elements are laterally supported by springs associated with fuel element receiving openings in a plurality of grid structures which extend transversely of the fuel elements.

The preferred fuel assembly presently utilized in nuclear reactors comprises a plurality of spaced, parallel and sheathed fissionable material bearing fuel elements which are laterally supported by springs projecting into fuel element receiving openings in grid structures which are placed at various positions along the length of the fuel elements. Usually one or more non-resilient dimples also project in each opening so that a flow channel substantially surrounds each fuel element at each grid opening and the fuel element is securely held therein.

Several related problems, inter alia, make the design of an efficient fuel assembly a rather complicated undertaking. In certain reactors, the fuel elements bearing fissionable materials should be situated as closely as possible to enhance neutron economy. However, at each grid location, or at each position where the fuel elements are laterally supported, a sufficient coolant flow channel must exist such that local temperature perturbations in the fuel rod cladding are not created. Moreover, the springs must be so supported, sized, oriented, configured, and located as to absorb relatively great amounts of energy due to the forces on the fuel elements without becoming plastically deformed. The springs must also be particularly insensitive to manufacturing tolerances. In addition to this, the springs must have sufficient compliance to provide ease of insertion of the fuel elements during manufacture.

More particularly, the solution to the above problems of the prior art was governed by the requirements for the spring. Current practice is to utilize either a cantilever or double ended type spring finger stamped into the grid straps so as to project into the grid openings. Usually several reverse curves are formed in the spring structure so as to cause the spring to flex at its ends and to obtain other desirable spring properties. Such a conventional cantilever double ended beam type spring finger must be located at the grid tangent points or at the sides of the grid. The geometry of such a spring finger necessitates the spring material extending in close proximity to the fuel tube in a streamwise direction on either side of the spring contact path. Thus, an area of reduced flow is generated which can extend up to four times the length of the contact point or pad. This flow restriction it is to be noted, occurs at a point where the flow in an unobstructed grid cell would otherwise be a minimum. The flow maldistribution is thus compounded at this point and heat transfer can be so impaired as to cause local temperature hot spots in the fuel rod cladding.

As the fuel rods or elements are brought closer and closer together, these local hot spots become unacceptable. Moreover, experience has shown that a double ended beam spring finger must have a relatively large working height in order to have acceptable spring characteristics. The reason for this is that as the working height is reduced the spring finger becomes overly sensitive to axial constraints at the beam ends and a rather high spring rate is obtained. Further, with such a spring the fuel rod locating forces become oversensitive to geometric changes produced by manufacturing tolerances, differential thermal expansion, and mechanical straining.

SUMMARY OF THE INVENTION

The aforementioned difficulties which exist in most prior art fuel assembly designs are obviated or decreased in accordance with this invention by providing a torsion spring which contacts the fuel element proximate a maximum flow area at each fuel element receiving opening in the grid structures thereof.

The torsion spring or, more precisely, the cantilever loaded torsion bar spring comprises a torsion bar and an associated cantilever loading arm with a raised contact pad which are formed or stamped integral with and out of each internal grip strap. The spring structure is so arranged and supported that any deflection is made up of three components: cantilever bending of the cantilever loading arm, beam bending of the torsion bar, and twisting of the torsion bar with its associated rigid body motion of the cantilever loading arm. For the conventional grid cell geometry the first two deflections are rather small with respect to rigid body motion about the torsion bar. Thus, the primary deflection or energy absorbing motion due to forces on a fuel element is taken by twisting of the torsion bar. The resulting stress distribution is uniform due to torsion rather than base peaking due to bending. Moreover, the deflection of the spring is such that the greatest deflection exists in the area of the grid which has the maximum clearance with the fuel bearing element. That is to say, by way of example, that in a square grid the major deflection would be towards a corner of the grid which is an area of maximum clearance. This feature allows for a low spring rate design which has minimum variation with manufacturing tolerances.

The cantilever loaded torsion spring design of this invention has its contact pad located proximate an area of maximum flow thereby improving the thermal and hydraulic characteristics of the fuel assembly. Moreover, the spring structure extends laterally of the fuel elements rather than streamwise and thus produces a less pronounced effect on the local temperature in the fuel rod cladding.

DESCRIPTION OF THE DRAWINGS

For a better understanding of the invention, reference may be had to the accompanying drawings, in which.

DESCRIPTION OF THE PREFERRED EMBODIMENTS

Figure 1:
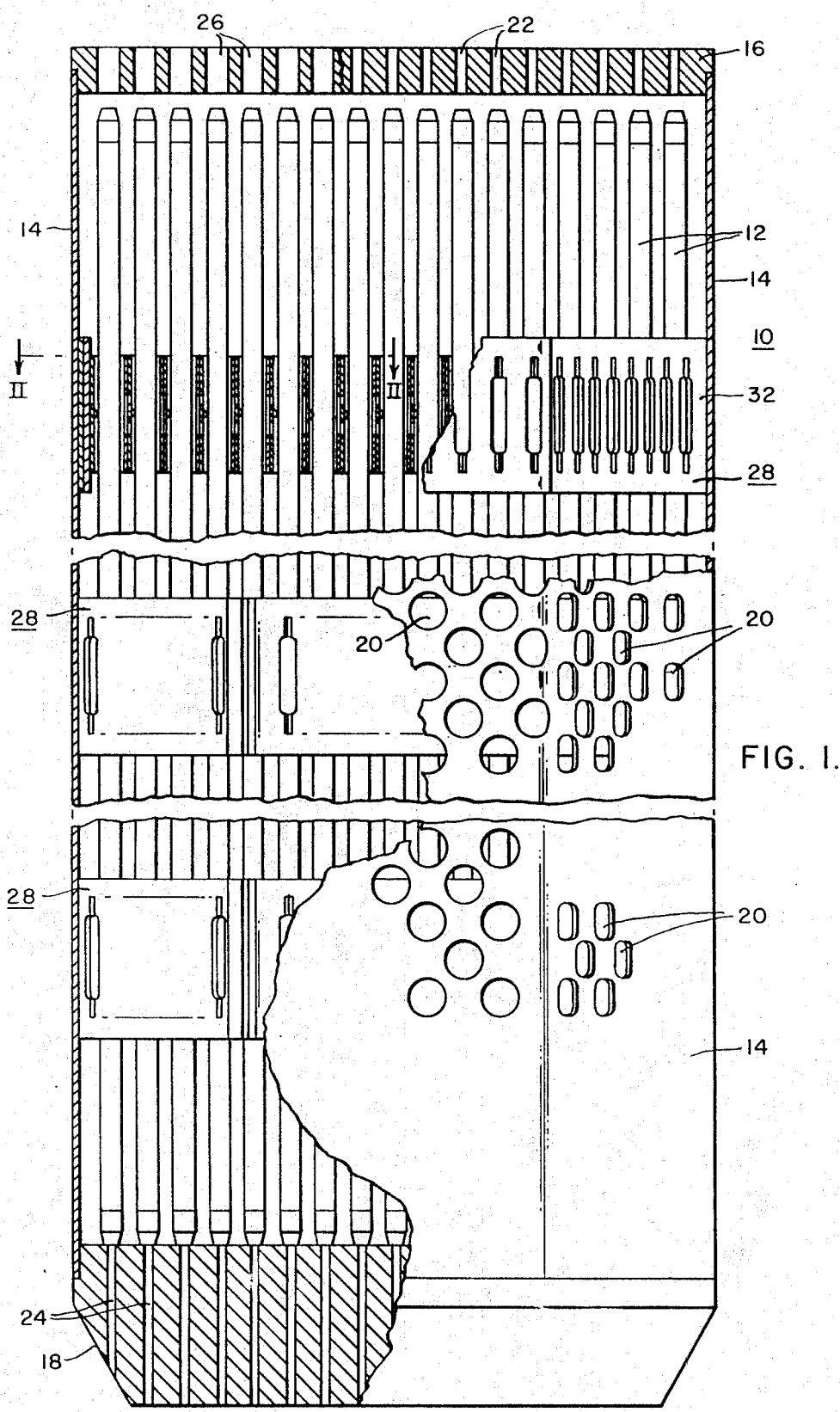
FIG. 1 is a view, in side elevation, of a fuel assembly, partially in section, representing an embodiment of the invention.

Referring now to FIG. 1, there is shown a fuel assembly 10 comprising a plurality of elongated parallel and sheathed fissionable fuel bearing fuel elements or rods 12 substantially fixedly held in a spaced relationship by a suitable supporting structure. In the example of FIG. 1 the supporting structure includes an elongated frame or support means, can 14 as depicted, an upper end plate 16 and a lower end plate 18. In this example, the support means or can 14 is secured as by welding or brazing to the end plates 16 and 18 and desirably has flow openings 20 through which coolant fluid crossflow can be established during operation. The upper end plate 16 and the lower end plate 18 also desirably have flow openings 22 and 24, respectively, therein to allow a longitudinal coolant flow to be established so as to maintain the fuel elements 12 which may be sheathed by a zirconium alloy or stainless steel cladding in a temperature range in which structural integrity is assured. The upper end plate 16 may also include openings 26 through which the fuel elements 12 may be inserted into the supporting structure.

The can 14 is but one example of a suitable elongated framing means which can be utilized to maintain structural rigidity of the fuel assembly 10 and as a means for obtaining proper spacing of a grid structure 28 to be described. In the example of FIG. 1, the grid structure 28 is secured to the can 30 as by welding or brazing and extends laterally across the can 30 and is utilized to provide lateral support for and spacing of the fuel elements 12. The particular spacing of the grids 28 is chosen so as to provide the proper amount of lateral support and to be compatible with the nuclear characteristics desired. Other elongated frame means which can be used in place of or in addition to the can 14 include a tie-rod structure wherein a plurality of elongated bars are secured to the upper end plate 16 and the lower end plate 18 and the grids in turn are secured thereto. The bars may be secured around the periphery of the fuel assembly 10. Alternatively, guide thimbles for control elements may be secured to the upper end plate 16 and the lower end plate 18 and form the elongated frame means. In the latter arrangement, the grid structure 28 is in turn secured to these thimbles which are desirably interspersed among the fuel elements.

Figure 2:
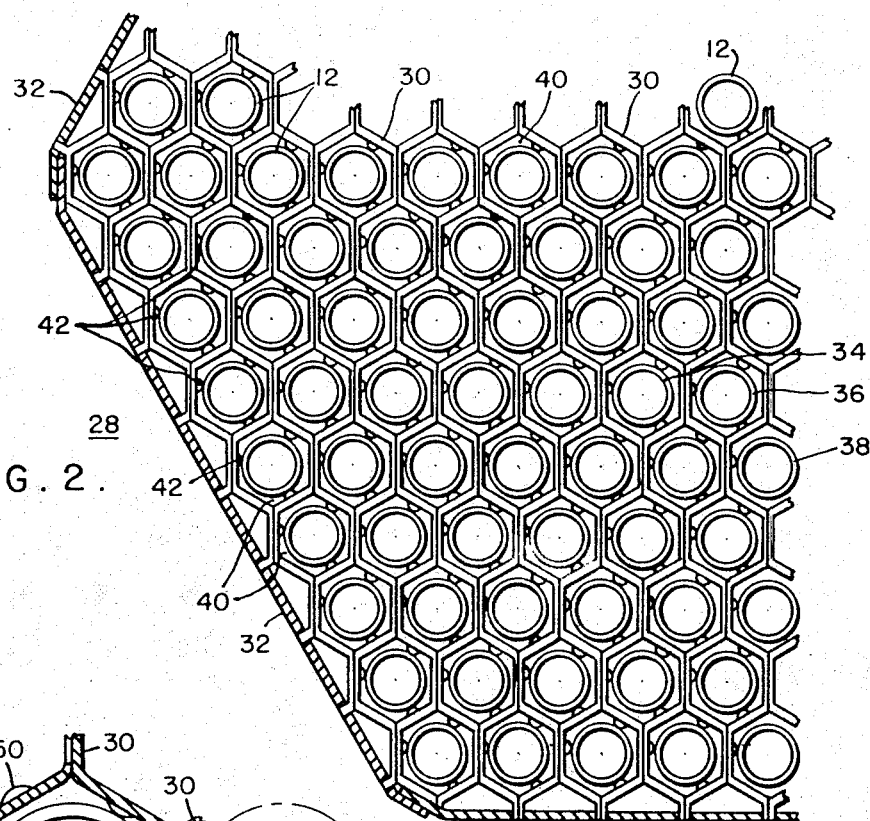
FIG. 2 is a cross-section of the fuel assembly of FIG. 1 taken along line II—II and showing a portion of a grid.
Figure 3:
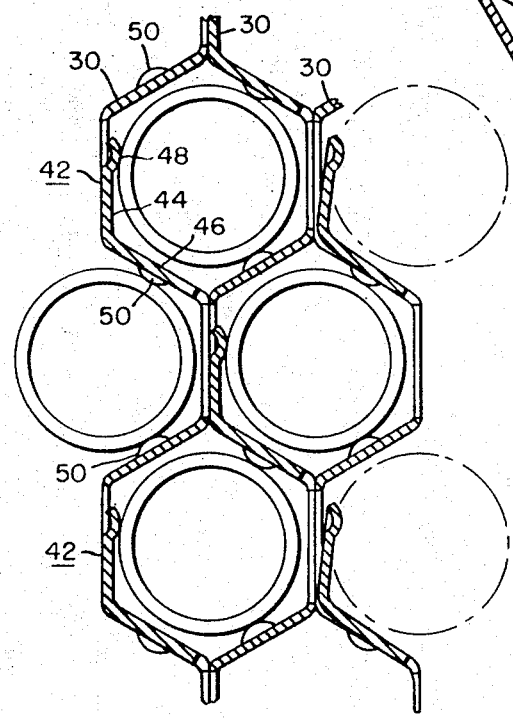
FIG. 3 is an expanded view of a portion of the grid shown in FIG. 2.

As viewed in FIGS. 2 and 3 a plurality of formed inner grid straps 30 are permanently secured each to the other, preferably by brazing, to form a honeycomb grid structure generally designated by the numeral 28. The ends of the inner straps 30 may be secured to a peripheral grid strap 32 and the peripheral grid strap may be in turn secured to a can 14 where that example of an elongated frame means is used; or could optionally form the outer boundary of the fuel assembly 10. As previously indicated it is desirable especially when operating in a high neutron energy range to place the fuel elements in close proxmity to each other. The spacing of the fuel elements 12 however is normally limited by the structural requirements for the grid straps 30, as well as by the means utilized to secure the fuel elements within the grid straps, and by the coolant requirements at the grid strap locations necessary to avoid local hot spots which otherwise limit the operation of the reactor.

In accordance with this invention, two separate features cooperate to permit closer spacing of the fuel elements 12 than would be otherwise possible. When a grid 28 is formed from bent elongated straps 30 of constant thickness, it is first to be noted that fuel elements 34 and 36 which are adjacent to each other across a brazed junction of two of the inner grid straps 30 would normally be further from each other than would fuel elements 36 and 38 which are adjacent each other across or separated by a single grid strap 30. In accordance with this invention, the distance between fuel elements 34 and 36 may be made identical with that between 36 and 38 by reducing the structural thickness, in this example by one-half, of the grid straps 30 at the locations where they are brazed to each other. It is further to be noted with respect to prior art grid structures wherein spring fingers are utilized to laterally support the fuel elements within grid openings 40 formed by the grid straps 30, that a relatively large working height, or distance through which the spring normally moves, was required in order to obtain a spring rate compatible with the support requirements and assembly requirements of a fuel assembly 10. In accordance with this invention, a cantilever loaded torsion spring 42 is utilized to support the fuel elements 12, which spring 42 is so located and structured as to be compatible with close spacing of the fuel elements 12.

Referring to FIGS. 2 and 3, the cantilever loaded torsion spring 42 may be seen to essentially comprise a cantilever spring finger 44 mounted on a torsion bar 46 with torsion bar 46 being created by opening 52 positioned on the side of bar 46 opposite to finger 44. A rigid means such as a dimple 48 preferably projects from the cantilever spring finger 44 to contact a fuel element 12. Displacement of the dimple 48 due to forces acting thereon may be viewed as made up of three composite movements: bending of the cantilever spring finger 44, twisting of the torsion bar 46, and rigid body motion of the finger 44 about the torsion bar 46 as the torsion bar is twisted. As will be shown the major amount of the deflection due to a force acting on a cantilever loaded torsion spring is taken in a rigid body motion of the spring finger 44 about the torsion bar 46. Or in other words, a major proportion of the energy due to deflection is stored in the torsion bar 46 as opposed to the cantilever spring finger 44.

As indicated the honeycomb structure is preferably formed by brazing together elongated, bent, inner straps 30. Each inner strap 30 extends across the assembly 10 and its ends are affixed to the peripheral grid strap 32. The individual inner straps 30 are preformed into a plurality of half honeycomb sections; each individual half-honeycomb section having a cantilever torsion spring 42 and in this example, four rigid dimples 50 formed therein. This last-mentioned feature may be seen most clearly in FIG. 3 and also appears in FIG. 4. The dimples 50, on one side of each half-honeycomb section, are preferably located above and below the torsion bar 48, with the dimples 50, on the other side, being aligned therewith. In each preformed inner strap 30, the dimples 50 are deflected from the strap 30 in a direction opposite to the cantilever loaded spring finger 42 so as to project into adjacent openings 40. Thus, when two inner grid straps 30 are brazed together at their reduced sections, a fuel rod opening includes in this example a spring finger 42 from one inner grid strap 30 cooperating with four dimples 50 from another inner grid strap 30 to form a five point lateral support for a fuel rod or fuel element 12.

Figure 4:
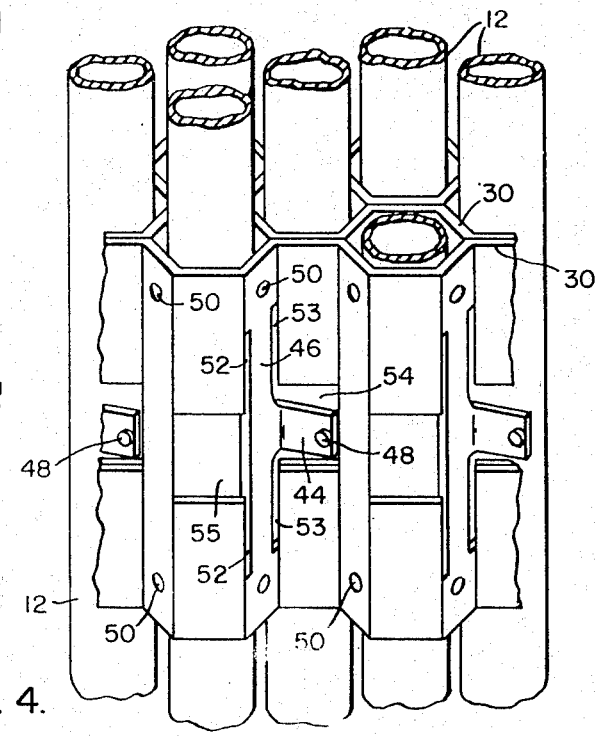
FIG. 4 is an isometric view of a portion of the grid of FIG. 2.

As can be noted most clearly in FIG. 4, the torsion bar effect, i.e., the ability of the torsion bar element 46 to absorb energy, is created by forming an extended opening or slit 52 on one side of the torsion bar 46 and enhanced by forming a pair of openings or slits 53 on the other side thereof. An opening 54 is provided in the adjacent internal strap portions communicating with the extended openings 53. Similarly, an opening 55 communicates with the extended opening 52. Spring finger 44 extends from torsion bar element 46 into the opening 54. The openings 54 and 55 are arranged to coincide when the plurality of inner straps 30 are brazed together such that each spring finger 44 has a window through which it may be deflected should lateral forces develop so as to force the spring outwardly toward an adjacent fuel element 12.

It has been determined with respect to a specific cantilever torsion spring design compatible with the spacing and materials requirements desired, that a spring rate of 0.0032 inches per pound is achievable with the arrangement of this invention. For this design, 81 percent of the elastic energy was absorbed in twisting of the torsion bar 46, while 3 percent went in bending of the torsion bar 46, and 16 percent into bending of the cantilever loading arm or spring finger 44. The resultant principal stress in the torsion bar was accordingly found to be 74,380 psi.

By way of contrast, calculations were performed for an equivalent cantilever spring, i.e., without the extended openings 52 and 53 which encourage twisting. With the latter construction, the achievable spring rate is 0.0013 inches per pound with a resultant stress level of 110,000 psi due to the fact that the cantilever spring is 2.5 times as stiff as an equivalent cantilever torsion spring for the same displacement.

Similar calculations were performed for a conventional longitudinal double ended cantilever spring and resultant stress levels in excess of 140,000 psi appeared to be the minimum possible under the same lattice conditions.

Accordingly, it should now be clear that since a cantilever torsion spring can absorb a major amount of deflection in twisting of its torsion bar that superior spring rates are possible, and thus, since twisting results in a uniform stress distribution, lower total stress levels result.

Figure 5:
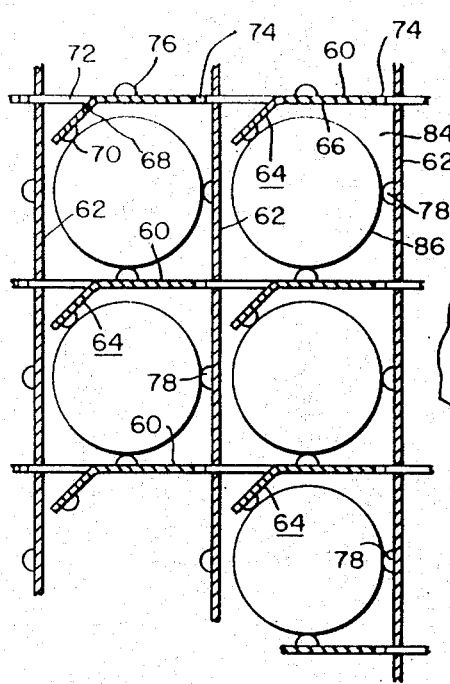
FIG. 5 is a sectional view of a portion of another embodiment of a grid in accordance with this invention.
Figure 6:
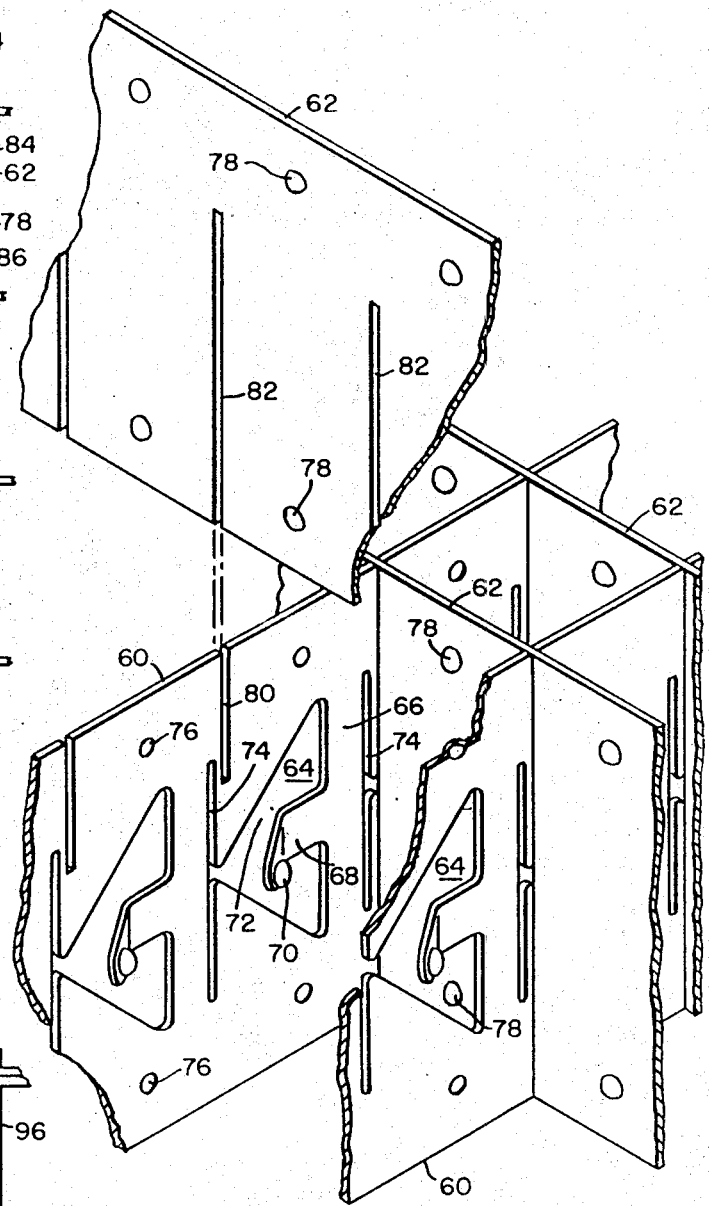
FIG. 6 is an isometric view of a plurality of grid straps, as in FIG. 5, with one strap removed to indicate the manner of construction.

Of course, the cantilever loaded spring in accordance with this invention may be utilized in any grid wherein a high energy absorbing spring and reduced flow blockage are desirable properties. By way of illustration, a cantilever loaded torsion spring embodied in a square array grid structure is shown in FIGS. 5 and 6. As may be noted in FIG. 5 two different types of internal grid straps 60 and 62 are utilized. For purposes of numerically distinguishing the grid straps, the ones running east-west in FIG. 5 have been designated by the numeral 60 and the ones running north-south therein have been designated by the numeral 62. The same numerical designation is utilized in FIG. 6. The internal grid straps 60 are formed with a plurality cantilever loaded torsion springs, generally designated by the numeral 64, and comprising a torsion bar portion 66 and a cantilever loading arm 68 having if desired, a rigid projection or dimple 70 formed therein. An opening or window 72 is provided for cantilever loading arm spring movement. An elongated slot 74 is provided which acts in a cooperative manner with an adjacent opening or window 72 to form and allow for torsional energy storage in the torsion bar 66. It will be noted in this embodiment that the window 72 projects into the elongated slot 74 because of the tight lattice exemplified this would not necessarily occur in looser lattice. The internal grid strap 60 also has one or more rigid projections or dimples shown in this example as a plurality of dimples 76 located vertically above and below the spring portion of the grid strap and projecting in a direction opposite to that of the loading arm 68. It should also be noted with respect to the embodiment shown that although the loading arm 68 is shown to be coplanar with the torsion bar 66, this is not essential, and the loading arm 68 may be uniformly bent or otherwise configured as long as the projection 70 on the loading arm 68 is located in a corner of the grid strap and thus forms a restriction only in an area of maximum flow.

The grid strap 62 which is perpendicular to the grid strap 60 has one or more dimples or rigid projections 78 formed therein. The dimples 78 may be seen to lie in the same plane as the dimples 76 when the grid is fully formed.

As can be clearly seen in FIG. 6, the grid lattice is formed by intermeshing the grid straps 60 and 62. For this purpose cooperating slots 80 in grid strap 60 and 82 in grid strap 62 are provided and located such that the slots may be inserted into each other to form the grid lattice. The grids 60 and 62 can be secured together by any suitable means such as by furnace brazing or welding to form a permanent structure.

Thus, it can be seen that at each grid opening 84, a fuel rod 86 has in this example a five point lateral support, that is, it is held by two dimples 76, two dimples 78, and dimple 70 on the loading arm 68. Other embodiments, within the scope of this invention, may employ only one dimple 76 and one dimple 78.

Figure 7:
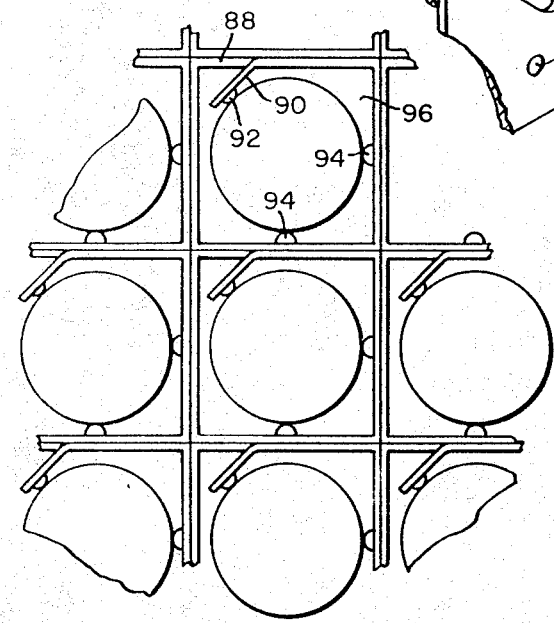
FIG. 7 is a sectional view of still another grid embodying the invention.

Referring now to FIG. 7, it can be seen that the grid lattice of FIGS. 5 and 6 may be formed of independent ferrules 88 each of which contains a torsion spring 90 with the dimple 92 and four other rigid projections or dimples 94. The grid assembly is then formed by welding or brazing the individual ferrules 88 together. Each grid opening 96 is thus identical as to the lateral fuel element supporting members as in the example of FIGS. 5 and 6.

The improvement in the grid structure of this invention is readily ascertainable when it is noted that the projections into the openings 40 in the embodiments of FIGS. 1 through 4 or 84 in the embodiment of FIGS. 5 and 6 are relatively short in the streamwise direction thereby minimizing the area of reduced flow. Moreover, as may be particularly noted in FIG. 5, the cantilever loading arm 68 engages a fuel rod or element in a corner or maximum flow area of the grid structure and thus eliminates the compounding of flow maldistribution which is usual in prior art grid structures. This last-mentioned feature also allows for high spring travel as it is located in an area of maximum clearance. Although the point of fuel rod engagement of cantilever loading arm 44 of the embodiment of FIGS. 1 through 4 is not shown in an exact corner of the grid structure, it should be noted to be offset toward the corner. This last-mentioned compromise was made for ease in construction and because the tolerance problem is not as great in the honeycomb grid structure. Further, the improvement in a new spring structure allows for a low spring rate, high spring travel with the uniform storage of most of the energy of displacement in the torsion bar portion.

While there have been shown and described what are at present considered to be the preferred embodiments of the invention modifications thereto will readily occur to those skilled in the art. In particular the cantilever loaded torsion bar spring improvement of this invention may be utilized with any grid lattice structure with good results. It is not desired, therefore, that the invention be limited to the specific arrangements shown and described, and it is intended to cover in the appended claim all such modifications as fall within the true spirit and scope of the invention.

We claim:

1. A fuel assembly for a nuclear reactor of the type wherein a coolant medium is caused to flow through longitudinal channels formed in the fuel assembly, which comprises:
   a plurality of elongated fuel elements disposed in a generally parallel array;
   at least one grid structure comprising a plurality of grid straps extending laterally across said fuel elements and forming a plurality of openings, some of said openings having fuel elements disposed therein;
   means for laterally supporting said fuel elements associated with said some of said openings including a relatively resilient loading member extending laterally into each said grid openings and slippingly contacting the fuel element, said loading member being connected to an intermediate portion of torsion member at its end opposite that which contacts said fuel elements, said torsion member being supported only at its opposite longitudinal ends by a grid strap for absorbing forces acting on the loading member by twisting whereby said forces are absorbed uniformly.

2. The fuel assembly of claim 1 wherein a rigid projection is interposed between the loading member and the fuel element at the point of contact and the longitudinal dimension of the rigid member is greater than one-fourth of the longitudinal dimension of the loading member.

3. The fuel assembly of claim 2 in which at least one additional substantially rigid member is interposed between the fuel element and the grid straps; opposing the loading arm.

4. The fuel assembly of claim 3 in which said additional rigid member is situated so that its contact point with the fuel elements are longitudinally displaced from that of said rigid projection interposed between the loading member and the fuel element.

5. The fuel assembly of claim 1 wherein each said torsion member extends from and is substantially coplanar with a grid strap.

6. The fuel assembly of claim 1 wherein each torsion member and each loading member is formed from a grid strap.

* * * * *